(12) United States Patent
Toebes et al.

(10) Patent No.: US 8,245,264 B2
(45) Date of Patent: Aug. 14, 2012

(54) METHODS AND SYSTEMS TO REDUCE CHANNEL SELECTION TRANSITION DELAY IN A DIGITAL NETWORK

(76) Inventors: John Toebes, Cary, NC (US);
Wen-Hsiung Chen, Sunnyvale, CA (US); Jack Cham, San Leandro, CA (US); Ping Li, Fremont, CA (US)

( * ) Notice: Subject to any disclaimer, the term of this patent is extended or adjusted under 35 U.S.C. 154(b) by 575 days.

(21) Appl. No.: 11/442,500

(22) Filed: May 26, 2006

(65) Prior Publication Data
US 2007/0277219 A1 Nov. 29, 2007

(51) Int. Cl.
*H04N 7/173* (2011.01)
(52) U.S. Cl. .................... 725/120; 725/90; 725/131
(58) Field of Classification Search ............ 725/131, 725/120
See application file for complete search history.

(56) References Cited

U.S. PATENT DOCUMENTS

| | | |
|---|---|---|
| 5,606,369 A | 2/1997 | Keesman et al. |
| 6,175,595 B1 | 1/2001 | Keesman |
| 6,629,318 B1 | 9/2003 | Radha et al. |
| 6,792,047 B1 | 9/2004 | Bixby et al. |
| 7,225,320 B2 | 5/2007 | Burns |
| 2002/0163911 A1* | 11/2002 | Wee et al. ................ 370/389 |
| 2004/0034864 A1* | 2/2004 | Barrett et al. ............... 725/38 |
| 2004/0194134 A1* | 9/2004 | Gunatilake et al. ........... 725/38 |
| 2005/0207449 A1* | 9/2005 | Zhang et al. ................ 370/486 |
| 2006/0075428 A1* | 4/2006 | Farmer et al. ............... 725/38 |
| 2007/0160038 A1* | 7/2007 | Liu et al. ................... 370/389 |
| 2007/0209054 A1* | 9/2007 | Cassanova ................. 725/100 |
| 2007/0214490 A1* | 9/2007 | Cheng et al. ............... 725/135 |

OTHER PUBLICATIONS

ISO/IEC 13818-2; "Information Technology—Generic Coding of Moving Pictures and Associated Audio Information: Video" Ref. No. ISO/IEC 13818-2:2000 (E); copy right 2000, Dec. 15, 2000.
International Telecommunication Union; "ITU-T Telecommunication Srandardization Sector of ITU, H.222.0(Feb. 2000) Series H: Audiovisual and MultiMedia Systems"; (171 pages).
CISCO Systems; "Managing Delay in IP Video Networks Version 1.0"; (pp. 16), 2005.

* cited by examiner

*Primary Examiner* — Kristine Kincaid
*Assistant Examiner* — Robert Hance
(74) *Attorney, Agent, or Firm* — Haynes and Boone, LLP (57) ABSTRACT

A method of reducing the channel selection transition delay from a first media data channel to a second media data channel includes the operations of accumulating an independent media data frame and any related dependent media data frames based on a first decoder decoding at least a first portion of a second channel to form a second channel current media state, receiving a channel change request from a second decoder to change decoding to the second media channel, identifying an insertion position for a current independent frame relative to a current second channel frame set, and generating the current independent frame based on the second channel current media state corresponding to the insertion position. The dependent media data frames are used to modify the second channel current media state based on the independent media data frame.

24 Claims, 6 Drawing Sheets

METHODS AND SYSTEMS TO REDUCE CHANNEL SELECTION TRANSITION DELAY IN A DIGITAL NETWORK

TECHNICAL FIELD

The field of invention relates generally to electronic communication over a network, and more particularly to reducing channel selection transition delay in a digital communications network.

BACKGROUND

Multimedia data and video programming are available in both analog and digital format over a variety of delivery services including cable, over-the-air broadcast, and the Internet. In a traditional analog distribution of a video signal, such as a television broadcast, a television set may receive and display the video signal nearly as soon as the tuner acquires the proper broadcast channel. Alternatively, in a digital broadcast, a television or Set-Top-Box (STB) decoder may need to wait after a channel change request until a particular reference frame, packet, or header from the newly selected channel is received prior to displaying any video signal. For the purposes of this disclosure, a video signal is one that contains a representation of a video output including a visual image and may include sound, closed caption text, and/or other associated information. Reproducing or displaying the video output may include displaying the visual image and emitting any corresponding sound information. When a display device such as a TV is connected to a digital network, such as one conforming to the Internet Protocol (IP), the channel changing time may take longer than for a TV that is connected to an analog network. In the case of a digital network, the channel changing time can be up to several seconds following the channel change. Such long delays can considerably lower the end user's quality of experience in comparison to their experience using an analog network.

Figure 1:
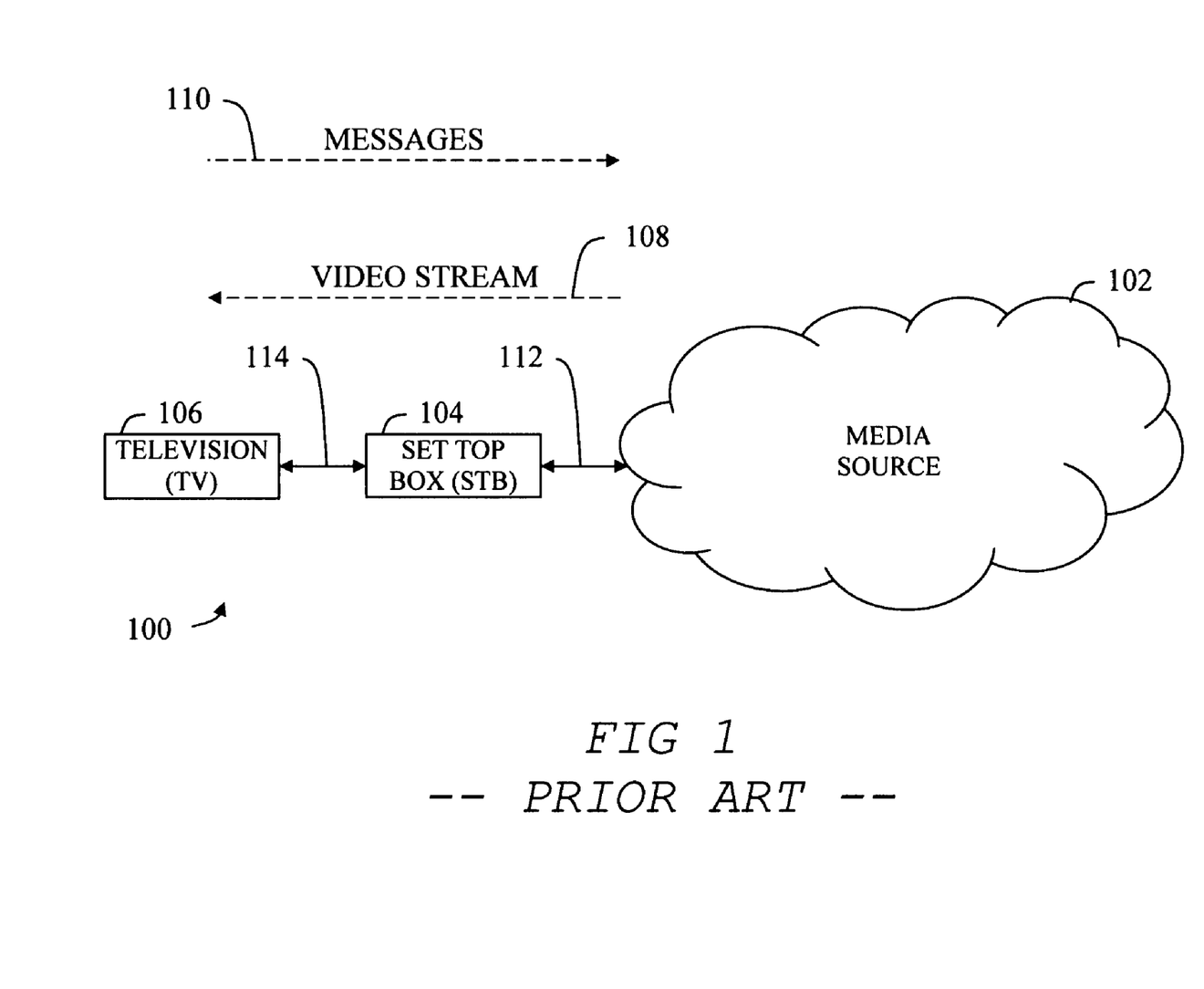
FIG. 1 shows a traditional video delivery system including a media source, a Set-Top-Box (STB) that receives and decodes data from media source, and a display device that receives the decoded data and displays the media content for a user.

FIG. 1 shows a traditional video delivery system 100 including a media source 102, a Set-Top-Box (STB) 104 that receives and decodes data from media source 102, and a display device 106, such as television (TV), that receives the decoded data and displays the media content for a user. Media source 102 may include a network, broadcasting, unicasting, or multicasting source comprising a source of video programming. Broadcasting may refer to a transmission that may be received by any receiver on a network, while multicasting may refer to a transmission that may be sent to or received by only members of a multicast group. Video stream data 108 may flow in a first direction, considered a downstream direction, from source 102 to TV 106. Message data 110 may flow in a second direction, opposite to the first direction, to provide interaction with one or more source servers within source 102. A bidirectional connection 112 provides for the exchange of video stream data 108 and message data 110 between source 102 and STB 104. Similarly, another bidirectional connection 114 provides for the exchange of video stream data 108 and message data 110 between STB 104 and TV 106. For a digitally encoded video stream, there may a channel change delay may occur for various reasons including acquiring program information, acquiring a reference frame, acquiring encryption information from the network, and/or factors associated with the way the video stream may be encoded before STB 104 can decode the new video stream for display on TV 106. A long channel change delay is one of the impediments in delivering acceptable video over IP networks, and laboratory tests have shown that delays within STB 104 are major contributors to the delay.

Figure 2:
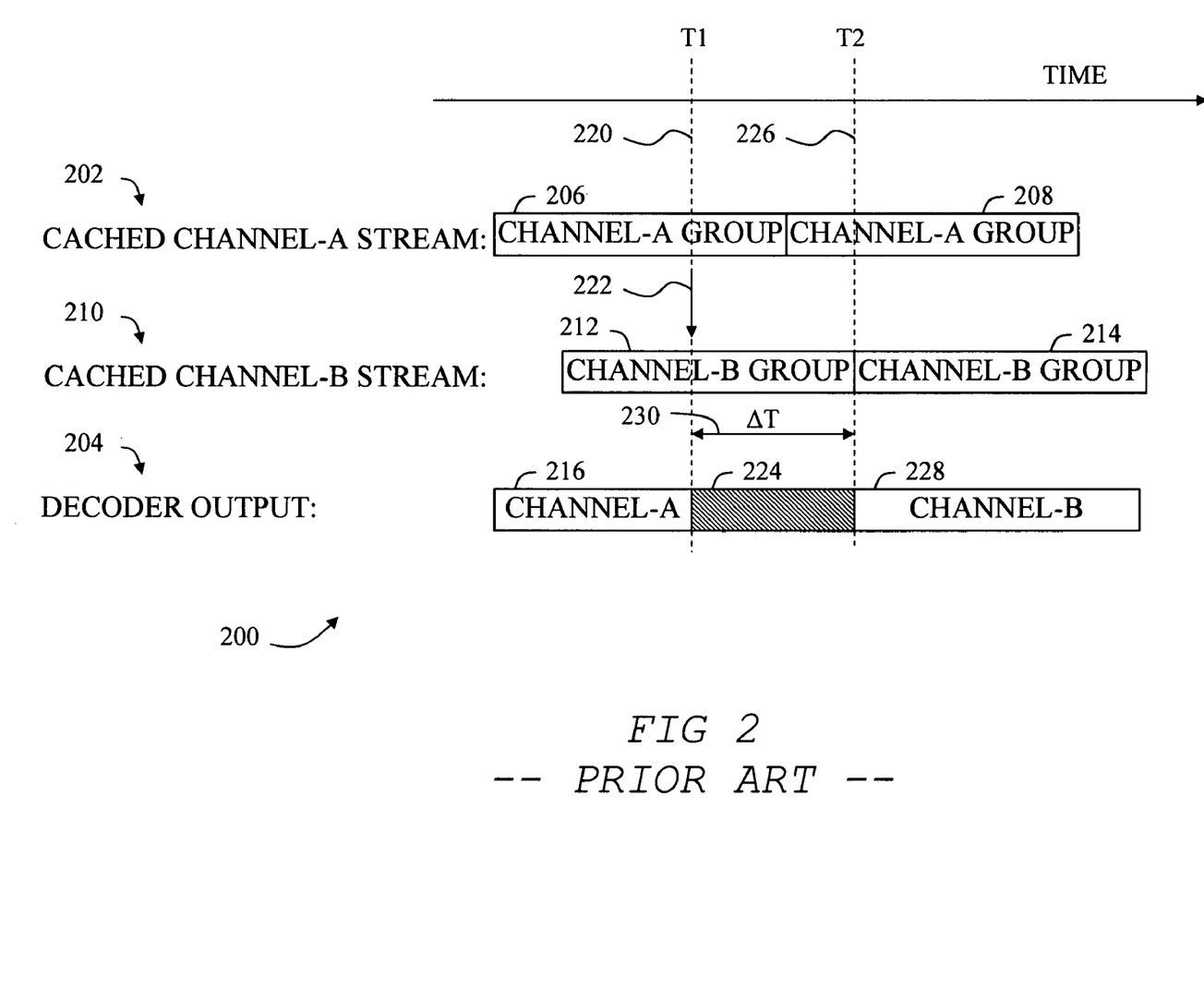
FIG. 2 shows a diagrammatic view of an exemplary channel change transition for a traditional STB decoder.

FIG. 2 shows a diagrammatic view of an exemplary channel change transition 200 for a traditional STB decoder. In reference to FIGS. 1 and 2, a traditional STB 104 is initially receiving a Cached Channel-A stream 202 and producing a current decoder output 204. Cached Channel-A stream 202 is a buffered video stream corresponding to a first channel and including a sequence of video data groups (206, 208) providing encoded data for display on TV 106 corresponding to a video program on Channel-A such as a movie, a commercial, or a video slide-show that may include moving pictures, static pictures, and/or sound. Similarly, Cached Channel-B stream 210 is a buffered video corresponding to a second channel and including a sequence of video data groups (212, 214) providing encoded data for display on TV 106 corresponding to a second video program on Channel-B such as a movie, a commercial, or a video slide-show that may include moving pictures, static pictures, and/or sound. Since STB 104 is currently decoding Channel-A stream 202, current decoder output 204 produces a video data output signal 216 corresponding to the data content of Channel-A stream 202. Typically, the groups of Channel-A stream 202 and Channel-B stream 210 may be asynchronous to each other.

In one type of system, media data in a channel group may include an independent reference data frame followed by a sequence of dependent data frames carried on a media data channel. For a typical STB to properly decode data in the group, the independent data frame must be decoded first before the associated dependent data frames may be decoded. An independent data frame may be decoded and displayed, whereas the subsequent dependent data frames must rely on a previously received independent data frame. If the independent data frame is positioned near the head of a group, then a STB must wait for the beginning of the next group received after the channel transition in order to decode data from the new channel. Since a traditional STB will typically include only one channel decoder to minimize cost, STB 104 may decode only one channel at a time.

Referring to FIGS. 1 and 2, if STB 104 is currently decoding Channel-A stream 202 and then receives a command at time T1 220 to make a channel change transition 222 to decoding Channel-B stream 210, decoder output 204 may transition to a blank output signal 224 or no-program output until an independent data frame is received from the newly selected channel. At a time T2 226, Channel-B data group 214 is arrives from Channel-B stream 210 and is decoded. Once the first independent data frame from Channel-B group 214 is decoded, STB current decoder output 204 will change to a Channel-B output signal 228 that corresponds to the media data carried by the first independent data frame from Channel-B group 214. In this manner, the undesirable blank or no-program output signal from STB 104 may occur during a time delay 230 as STB 104 waits to receive and decode the first independent data frame from Channel-B group 214.

Figure 3:
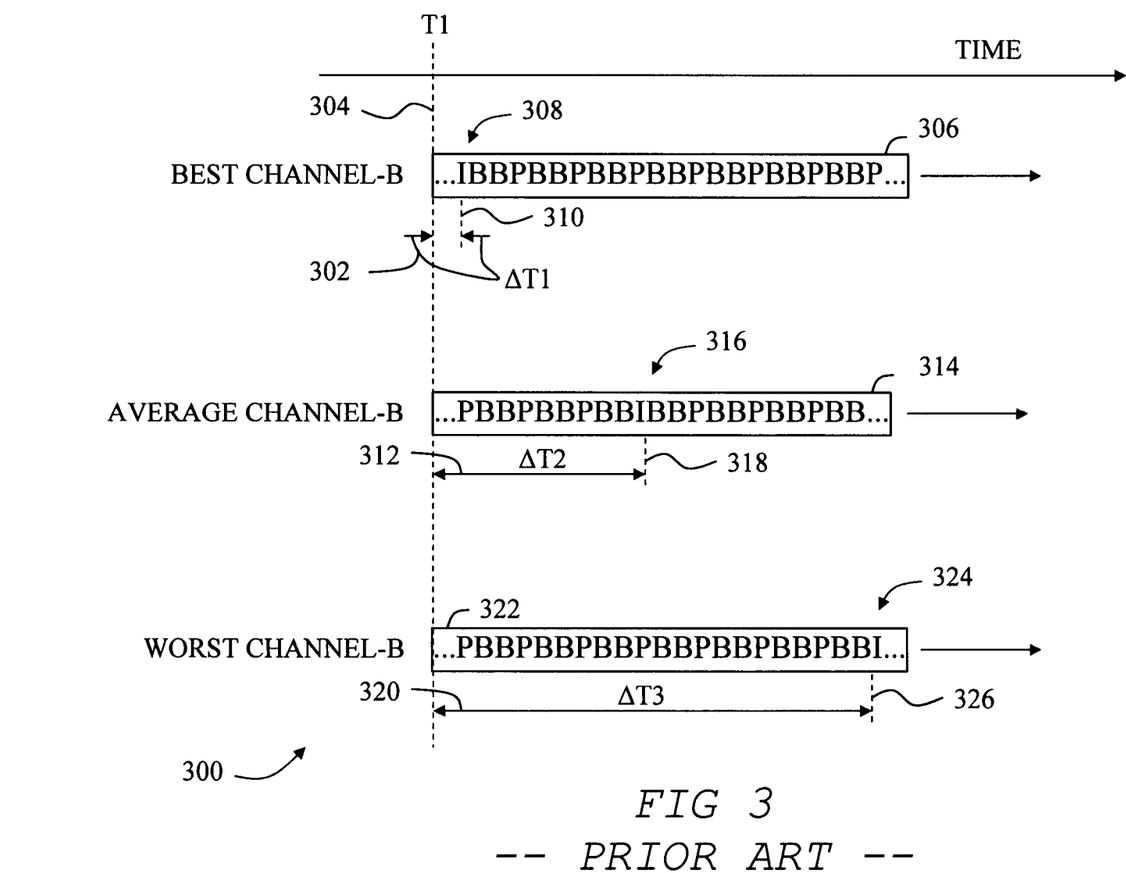
FIG. 3 shows an exemplary decoder transition delay time chart for a traditional video delivery system.

FIG. 3 shows an exemplary decoder transition delay time chart 300 for a traditional video delivery system. In this example, a decoder would incur a best-case delay time $\Delta T1$ 302 when transitioning at a transition time 304 to a best channel-b 306 having a first independent data frame 308 arrive at a best arrival time 310. Similarly, a decoder would incur an average-case delay time $\Delta T2$ 312 when transitioning at a transition time 304 to an average channel-b 314 having a first independent data frame 316 arrive at an average arrival time 318. Finally, a decoder would incur a worst-case delay time $\Delta T3$ 320 when transitioning at a transition time 304 to a worst channel-b 322 having a first independent data frame 324 arrive at a worst arrival time 326. Some prior attempts to address the blank or no-program output have addressed this issue by sending a copy of an original reference frame or a dummy reference frame first to STB to speed up channel change time. However, one problem with this approach of sending the original I frame to STB is that there is a catch up time between cached stream and original stream. The catch up time could be up to an entire Group of Pictures (GOP) or frame set time. To catch up original stream, network would need to burst cached stream. This will cause a problem (require more bandwidth during bursting) in the "last mile" connection to the user STB when access bandwidth is typically constrained as in a Digital Subscriber Line (DSL) network.

The video stream can include video programming delivered according to a current or future video standard document, such as one of the family of standards promulgated by the Moving Picture Experts Group (MPEG) including MPEG-1, MPEG-2, and MPEG-4, the International Organization for Standardization (a.k.a. ISO), the International Electrotechnical Commission (IEC), and/or the International Telecommunications Union (ITU). In some cases, a particular standard may be published or reprinted by another standards body. For example, the publication ITU-T H.222.0 states, in pertinent part on page i, "The ITU-T Recommendation H.222.0 was approved on 27 May 1999. The identical text is also published as ISO/IEC International Standard 13818-1." Further, the publication International Standard ISO/IEC 13818-2 states, in pertinent part on page v, "International Standard ISO/IEC 13818-2 was prepared by Joint Technical Committee ISO/IEC JTC 1, Information technology, Subcommittee SC 29, Coding of audio, picture, multimedia and hypermedia information, in collaboration with ITU-T. The identical text is published as ITU-T Rec. H.262.". Therefore, the referenced documents ITU-T Rec. H.222.0 and ISO/IEC 13818-1 are identical to each other, and the referenced documents ITU-T Rec H.262 and ISO/IEC 13818-2 are identical to each other. The described standard reference documents H.222 and H.262 are hereby incorporated herein by reference.

Video streams typically include a sequence of frames each having a particular type, and typically including two or more pictures per frame. The frame types may include independent or Intra-coded frames (I-frames), Predictive-coded frames (P-frames), and Bidirectionally predictive-coded frames (B-frames). An I-frame is coded using information only from itself, and is the only frame type that contains enough information for a decoder to reconstruct a complete image. A P-frame is one where the pictures are coded using motion compensated prediction from a past reference frame or past reference field. A B-frame is one where the pictures are coded using motion predicted from either a past or a future reference frame. For both a P-frame and a B-frame, another frame of reference is needed to construct a complete and current decoded image. Hence, an I-frame is considered an independent frame, while P/B-frames are considered dependent frames.

In reference briefly to FIG. 1, to change the received video stream to a different stream, a user may operate TV 106 to select a new channel. In this example, STB 104 may receive a change request message from a user operating an STB remote control (e.g. an infrared remote) or from TV 106 via link 114. STB 104 processes the request and may send an Internet Group Management Protocol (IGMP) leave request in upstream direction 110 to the old multicast source in order to unsubscribe STB 104 from membership in the old multicast group associated with the previously received video stream. IGMP is defined in an Internet Engineering Task Force (IETF) document Request For Comments (RFC) 1112, commonly referred to as IETF-RFC 1112. Once the IGMP leave message is sent, an IGMP join message is sent to the associated new multicast source corresponding to the newly selected video channel in order to subscribe STB 104 for membership in the new multicast group. Once the IGMP join message is sent, STB 104 is reset and waits for the video traffic associated with the newly selected video channel to arrive. STB 104 buffers the video data from the newly selected video channel and then decodes and displays the newly selected video stream by sending the decoded video stream to TV 106. In this manner, the currently decoded video channel may be changed in a traditional digital video delivery network. According to the MPEG-2 standard, a video stream includes a sequence of frames that are encoded to provide significant compression. When switching channels, the first I-frame arrival time from the newly selected channel may be considered a random event since the previously selected channel and the newly selected channel may be asynchronous to each other.

The delay before the arrival of the next independent frame for a newly selected channel can be substantial, and may contribute to a poor user experience as a subscriber to an Internet Protocol Television (IPTV) network. For example, the delay can be from about 0.5 to 5 seconds, depending on the encoding; and may have a fixed or variable period. Accordingly, there is a need in the art for a method and system for reducing the channel selection transition delay in a digital network.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Systems and methods are disclosed to provide a reduced channel selection transition delay in a digital network. One or more systems and methods reduce the impact of uncertainty of channel change time related to a sometimes large channel frame set size. Bandwidth requirements associated with a traditional "catch up" scheme are also reduced.

Figure 4:
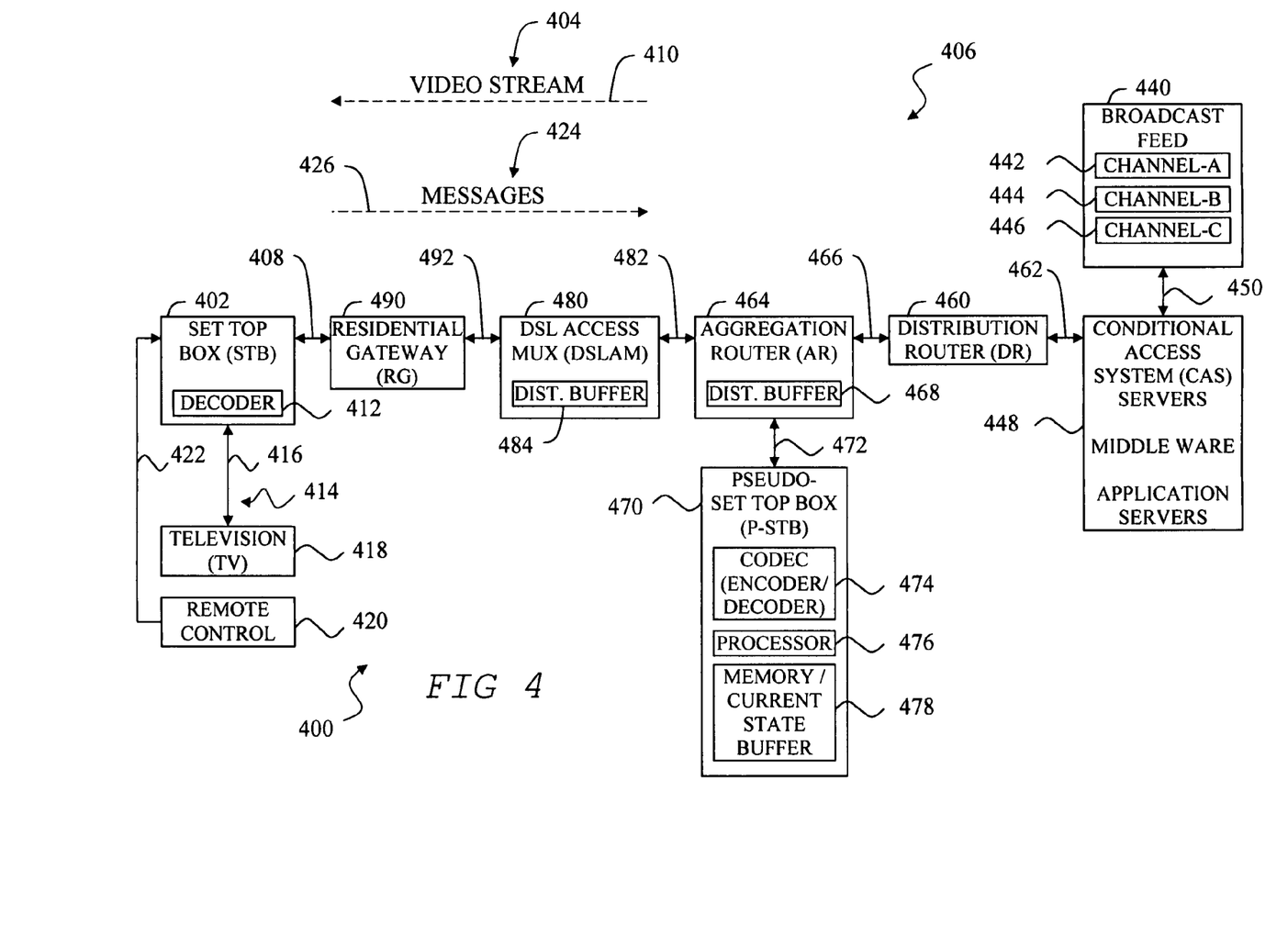
FIG. 4 shows a media data delivery system, in accordance with an embodiment of the present invention.

FIG. 4 shows a media data delivery system 400, in accordance with an embodiment of the present invention. Media data delivery system 400 may include a Set Top Box (STB)

402 that receives a video stream 404 comprising control and media data from a media source 406 through a media network connection 408 in a downstream direction 410. STB 402 may include many other components including a processor configured to fetch, decode, and execute computer instructions in a memory in order to decode and/or decrypt received media data and/or messages. The received video stream 404 may be decoded by a decoder 412 in STB 402 and a video output 414 asserted through connection 416 to a display device, such as a television 418, so that media data comprising image and/or sound data may be presented to a user corresponding to the content of video stream 404. A remote or other user control 420 may be used to send control signals or commands 422 to STB 402 in order provide user input including a user selection of the received channel, user and/or account information, and/or other video delivery related information. Message data 424 may be sent in an upstream direction 426 through a connection 408 to media source 406. Message data 424 may include control information in response to a user command and/or a response from STB 402 such as a handshake, a request, a confirmation, and/or a reply.

Media source 406 may include multiple levels of network devices and/or servers configured to deliver a user-selected video channel to STB 402. In one exemplary embodiment, Media source 406 includes a broadcast feed 440 comprising a source of video data, including video stream 404, and may include the transmission of one or more video signals in a video transport format including a video Channel-A 442, a video Channel-B 444, and/or a video Channel-C 446. Broadcast feed 440 may communicate with one or more Conditional Access System (CAS) servers 448 through a connection 450. CAS 448 may include various components including middle-ware configured to enable distribution at least one of the video channels (442, 444, 446) as video stream 404, and one or more application servers configured to receive and conditionally replay one or more video streams from broadcast feed 440. CAS 448 may communicate with a distribution router (DR) 460 through a connection 462, while distribution router 460 may communicate with an aggregation router (AR) 464 through a connection 466.

DR 460 may be configured to provide distribution of video stream 404 to a plurality of aggregation routers, including AR 464, while AR 464 is configured to receive a video stream from a plurality of distribution routers, including DR 460. Although only one DR 460 and one AR 464 are shown in FIG. 4, media source 406 may include a plurality of each in various interconnection topologies. AR 464 may also be considered a video acceleration or edge card, and may include a distribution buffer 468 configured to store and retrieve video stream data including control and media data in order to limit the bandwidth needed by a downstream portion of a network. Connection 466 may be considered to have a higher bandwidth than connection 482, for example, since a plurality of signals and/or channels may be aggregated in AR 464. In order to limit the amount of bandwidth required on a portion of a network, the number of channels may be restricted, for example. Buffer 468 may be selectively modified to alter the content of a frame set so that one or more frames may be inserted, deleted, and/or modified prior to sending to a receiving device such STB 402. In this manner, the content of a distributed video stream may be altered.

A Pseudo-Set Top Box (P-STB) 470 may communicate with AG 464 through a connection 472, where P-STB 470 is configured to receive and process at least one video channel (442, 444, 446) from video stream 404. P-STB 470 may have a local or uncached connection with AG 464 in order to minimize delays caused by caching. As disclosed, P-STB 470 can include all of the capabilities of user STB 402, with full access to an uncached video stream as a subscriber. In this manner, P-STB 470 will be "ahead" of the processing and decoding of a user STB 402. P-STB may include a codec (encoder/decoder) 474, a processor 476, and/or a memory 478. Codec 474 receives the video stream and decodes the video stream into a current media state comprising at least one of current video image data, current audio sound data, and/or control information configured to regulate or modify the output of the decoded video stream. Codec 474 may then encode the current state of the sequentially decoded/processed media frames to produce an independent media frame corresponding to the decoded current state. Codec 474 may be compliant with a particular standard including H.222, H.262, and/or an MPEG video encoding and decoding standard.

Processor 476 can be a suitably programmed microprocessor or microcomputer configured to fetch, decode, and execute computer instructions in a memory to decode, decrypt, and/or encode media data and/or messages. Memory 478 can be a device configured to store and retrieve computer information including instructions for processor 476, intermediate processor results, and/or a buffer configured to store and retrieve processed or unprocessed media data. In one embodiment, memory 478 may store unprocessed (i.e. raw) media data prior to decoding by codec 474, and/or memory 478 may store processed (i.e. decoded) media data comprising a current media state. Processor may accumulate the independent frame (I-Frame) and any dependent media frames (P/B-Frames) to decode and construct a current independent media frame that is an independent media data frame corresponding to the current state of the decoded video stream.

A Digital Subscriber Line (DSL) Access Multiplexer (DSLAM) 480 may communicate with AR 464 through a connection 482, where DSLAM 480 may concentrate a plurality of network connections of a lower data rate into a single connection at a higher rate. DSLAM 480 may include a distribution buffer 484 configured to store and retrieve video stream data including control and media data in order to limit the bandwidth needed by a downstream portion of a network. Connection 482 may be considered to have a higher bandwidth than connection 492, for example, since connection 492 may be considered the "last mile" of a particular user connection where bandwidth utilization may already be very high or severely limited. Similar to buffer 468, buffer 484 may be selectively modified to alter the content of a frame set so that one or more frames may be inserted, deleted, and/or modified prior to sending to a receiving device such STB 402. In this manner, the content of video stream 404 may be altered by either or both buffer 468 and buffer 484. DSLAM 480 may communicate with a Residential Gateway (RG) 490 through a connection 492. RG 490 may be configured to provide communication between STB 402 and DSLAM 480 where connection 408 may be considered a part of a Local Area Network (LAN) while connection 492 may be considered a Wide Area Network (WAN) connection.

It is preferred that a particular P-STB 470 may decode an assigned channel whether or not any STB 402 in the extended network is currently decoding that channel. In this manner, there would be a one-to-one correspondence between the number of P-STBs and the number of channels. Alternatively, some premium channels may have a particular P-STB assigned in order to reduce channel transition delay when selecting the premium channel, while lower-cost channels may not have an assigned P-STB. In yet another alternative, a particular P-STB may be assigned to a first channel at a particular time or for a particular period and then be re-assigned to a second channel for a particular time or period. In this manner, a possibly reduced number of P-STBs in a network may be efficiently utilized based on user demand at a particular time or period. In another application, a particular P-STB may be assigned to a particular premium user accessing the network through a particular user STB. In one application, the user may typically change to either ascending or descending channels while "surfing" for a channel of interest. The premium user P-STB may anticipate channel changes by the user and prepare the next most likely channel in order to reduce the channel change transition delay for the anticipated channel. For example, a premium user may dwell on a particular channel for five seconds in an ascending (descending) channel change pattern. The premium user P-STB may process the next higher (lower) channel in order to anticipate a possible change to the next channel. Other such patterns may be detected and/or anticipated based on average user channel access patterns, popularity of a set of channels, etc.

In many networks, the content of the video stream is protected from unauthorized use by encryption. In this manner, the encrypted frames may not be useful to anyone who does not have the corresponding decryption key. A content provider may periodically send out decryption keys to authorized users for installation within the user STB 402 so that encrypted frames and/or encrypted content may be accessed by the users. The use of encryption/decryption can create a processing overhead which can add delays due to the transport of keys and/or key exchange/updates, padding of data blocks to better conform to an encryption scheme, and/or delays caused by missing a periodically broadcast block of synchronization data used in the decrypting process. To address these and other concerns, up to two independent frames may be sent "in the clear" without encryption so that the user STB (or headend device) which may then be synchronized to the newly selected channel within two frames. Alternatively, if P-STB 470 starts upcoding an I-Frame as soon as the first macro block is received, the resulting delay may be no more than the length of one frame plus the length of one macro block. In this case, the delay would be based on the time to decode and encode a single macro block plus the network transit delay. The generation and insertion of a new independent frame may not be included within the decryption scheme. Decryption may be resumed with the subsequently received dependent data frames and/or the independent frame in the subsequently received frame set. In one embodiment, control of the media content may rely on a Digital Rights Management (DRM) scheme such as provided by CAC Media, a New York USA based company that provides software and services for set-top boxes and other media devices.

Figure 5:
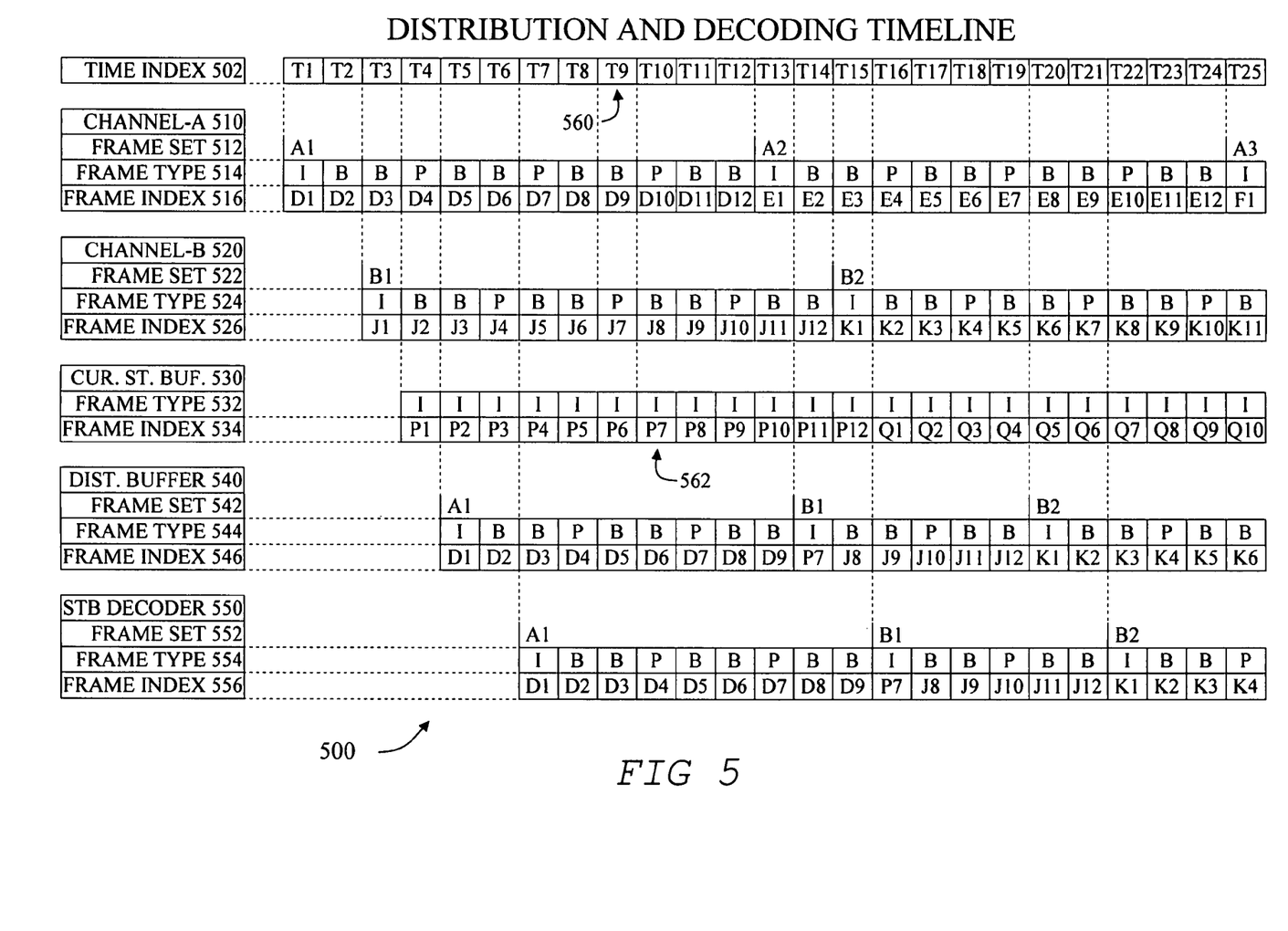
FIG. 5 shows an exemplary distribution and decoding timeline, in accordance with an embodiment of the present invention.

FIG. 5 shows an exemplary distribution and decoding timeline 500, in accordance with an embodiment of the present invention. Timeline 500 includes a time index 502, a video channel-A 510, a video channel-B 520, a current state buffer 530, a distribution buffer 540, and a STB decoder 550, where the events of timeline 500 are distinguished based on time index 502. Video channel-A 510 may include a sequence of media frame sets 512 each comprising a media frames having a particular frame type 514 and identified by a frame index 516. Video channel-A corresponds to a particular embodiment of video stream 442 within broadcast feed 440 as shown in FIG. 4. In this example, video channel-A 510 includes three partial frame sets (A1, A2, A3), where each frame set includes a sequence of media data frames beginning with an intra-coded (I-Frame) followed by a sequence of dependent media data frames (P-Frame and B-Frame), where frame set A1 includes the frames D1-D12, frame set A2 includes the frames E1-E12, and frame set A3 includes the frames F1-F12 (not all shown). Other frame sets, including A4 and following, may be asserted. It is understood that each frame set may have a larger or smaller size in terms of the number of frames, and that the broadcast of frames will continue while the channel is in service. Additional frame types may be used as needed to provide control and/or status information for devices receiving media data on the channel.

Video channel-B 520 may include a sequence of media frame sets 522 each comprising a media frames having a particular frame type 524 and identified by a frame index 526. Video channel-B corresponds to a particular embodiment of video stream 444 within broadcast feed 440 as shown in FIG. 4. In this example, video channel-B 520 includes three partial frame sets (B1, B2), where each frame set includes a sequence of media data frames beginning with an intra-coded (I-Frame) followed by a sequence of dependent media data frames (P/B-Frames), where frame set B1 includes the frames J1-J12, and frame set B2 includes the frames K1-K12 (not all shown). It is understood that video channel-B frames will continue while the channel is in service. Video stream 442 may be continuously running in an asynchronous manner with video stream 444, hence it is understood that the distribution of frame sets may include a continuous stream of video media data. More video channels may be included. Hence, this description related to two channels (510, 520) is not considered limiting. One or more of a plurality of video/media channels (442, 444, 446) may be provided by broadcast feed 440, through CAS 448, through DR 460, and to AR 464, as shown in FIG. 4.

As shown in FIGS. 4 and 5, current state buffer 530 retains the current media state of a decoded video stream. Buffer 530 can be a particular embodiment of memory 478 within P-STB 470 as shown in FIG. 4. At least one video/media channel (442, 444, 446) may be received and/or decoded by P-STB 470 and stored in buffer 530. Buffer 530 may store and retrieve the raw or decoded media data corresponding to a particular video channel (e.g. channel-B 520) and an independent media data frame 532 corresponding to the current state of the decoded video stream at a particular frame index 534. A sequence of independent media data frames may be generated, stored, and/or retrieved based on when a request for the current independent media data frame was made, received, and/or processed. In this example, frame sequence P1-P12 corresponds to a series of current independent media data frames generated based on the sequential processing of channel-B 520 frame set B1, while frame sequence Q1-Q12 (not all shown) corresponds to the current independent media data frames generated (or upcoded) based on processing channel-B 520 frame set B2. Other frame sets, including B3 and following, may be asserted. In this manner, a current independent media frame is regularly generated and ready for distribution to a user device that requests decoding of channel-B 520. While the current state of a particular video stream is maintained continuously in current state buffer 530, it is not necessary to continuously generate an independent frame (I-Frame) in anticipation of a possible need. In this case, an I-Frame may be generated only when the request for an I-Frame is received.

Distribution buffer 540 receives and distributes a particular, user selected video stream, in order to limit the bandwidth needed by a downstream portion of a network. For example, distribution buffer 540 may be a particular embodiment of either distribution buffer 468 or distribution buffer 484. Distribution buffer 540 may receive a sequence of media frame sets 542 each comprising a media frames having a particular frame type 544 and identified by a frame index 546. The contents of distribution buffer 540 may be modified based on a changing user selection. The contents of distribution buffer 540 then may be provided through DSLAM 480 and through RG 490 to user STB 402. Alternatively, distribution buffer 484 may receive the video/media stream directly, and the contents of distribution buffer 484 may be modified based on a changing user selection. The contents of distribution buffer 484 then may be provided through RG 490 to user STB 402. Distribution buffer 540 may be considered a cached data stream since the video stream from broadcas feed 440 is queued prior to decoding by user STB 402. The alterability of distribution buffer 540 provides an opportunity to insert a generated independent frame (I-Frame) in a proper position and route subsequent dependent data frames into distribution buffer 540 to provide reduction of a channel selection transition delay.

In this example, a user has initially selected channel-A 510 for distribution and decoding on a user STB 402. During time index T9 current state buffer 530 (AR 464) receives a user channel change request 560, such as an IGMP join message, configured to change the distributed video stream from channel-A 510 to channel-B 520. AR 464 receives and processes the channel change request, and then routes a corresponding request for a current independent media frame to P-STB 470. This request can be a network message sent over connection 472 or can be a hardwired signal asserted over a separate, local connection. At time index T10, a current independent media frame P7 562 is generated and made available. Current independent media frame P7 562 is an independent media frame corresponding to the current state of the decoded media from channel-B 520 at the time of the request. P-STB 470 may continuously receive, process, decrypt, decode, and generate a series of independent frames corresponding to the monitored channel where the generated independent frames may be stored in memory 478. Alternatively, P-STB 470 may generate independent frames on-demand and then provide them to the requesting device or another network node. P-STB 470 provides P7 562 to AR 464 which is then inserted into distribution buffer 468 at the appropriate position in reference to the end of the corresponding frame set for which it is generated. In this manner, the generated independent media frame P7 562 is placed in a buffer position before the dependent media frames in the buffer that will follow and modify the media state based on independent media frame.

In this example, P7 562 is placed in distribution buffer 540 at a position before the remaining portion of the channel-B frame set including dependent frames J8-J12. In this manner, the distributed media stream is changed from channel-A 510 to channel-B 520 where a generated independent media frame (I-Frame) is inserted into distribution buffer 540 prior to the subsequently processed/decoded dependent media frames J8-J12 so that STB 402 receiving the distributed media stream may quickly decode and reproduce media output corresponding to the current state of channel-B 520 without waiting for the beginning of a new frame set. Stated differently, the P-Frame in position J7 is replaced by the generated I-Frame P7 562 so that the subsequently received dependent frames (J8-J12) will modify the current state defined by independent frame P& 562. Hence, the channel selection transition delay in changing from decoding channel-A to decoding channel-B is reduced. Further, since the substitution of a generated independent media frame is made within the distribution network away from the end user STB 402, the bandwidth requirements are minimized for the "last mile" connection to STB 402. Subsequently received frame sets from channel-B 520 will be unaltered within distribution buffer 540 if there is no subsequent channel change request. Although, P-STB 470 is shown as monitoring channel-B 444, P-STB 470 may monitor any other channel (442, 446). A plurality of pseudo set-top-boxes (P-STBs) may be disposed at various points within the video distribution framework 406, each monitoring a different channel, in order to provide the reduced channel changing capability as described. Hence, each unicast, multicast, or broadcast channel may have one additional subscriber which is watching the video stream at all times. A network node within the distribution framework may receive the channel change request and forward a version of the request to the corresponding P-STB that is monitoring the selected "change-to" channel.

Figure 6:
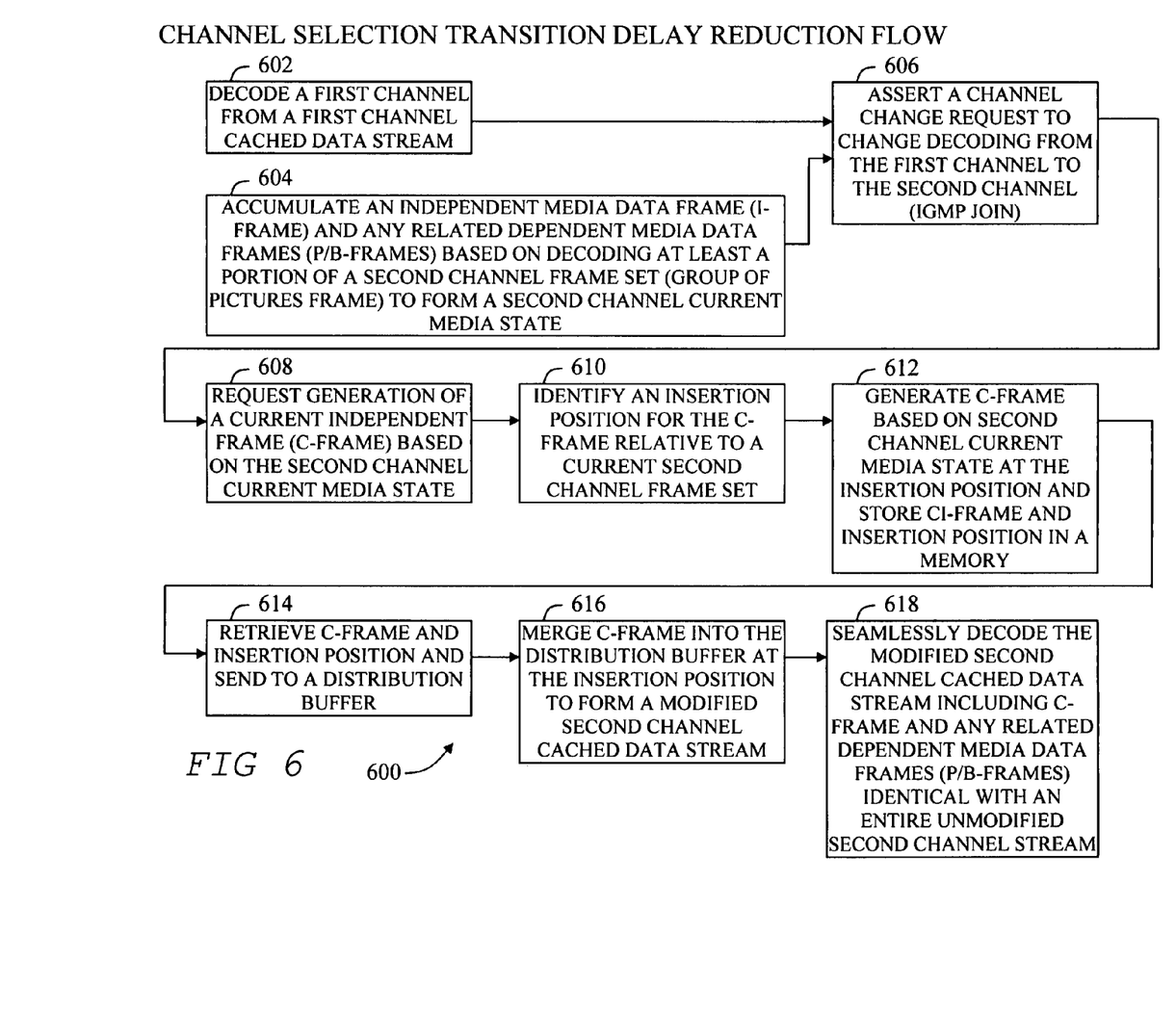
FIG. 6 shows a channel selection transition delay reduction flow, in accordance with an embodiment of the present invention.

FIG. 6 shows a channel selection transition delay reduction flow 600, in accordance with an embodiment of the present invention. In reference to FIGS. 4-6, flow 600 may include decoding a first channel (e.g. channel-A 510) from a first channel cached stream in operation 602 and simultaneously accumulating an independent media data frame from decoding a second channel (e.g. channel-B 520) in operation 604. Accumulating an independent media data frame and any related dependent media data frames in operation 604 is based on the P-STB decoder 474 decoding at least a first portion of the second channel frame set to form a second channel current media state. The first portion includes the independent media data frame and any subsequently received dependent media data frames. Flow 600 continues with asserting a channel change request to change decoding from the first channel to the second channel. The channel change request can be an IGMP join message asserted by a user STB 402, for example. Other manner of channel change notification may also be used. Flow 600 continues where the channel change request message may be received by a distribution network node such as AR 464 which then forwards a corresponding request to generate a current independent frame (I-Frame) based on the second channel current media state in operation 608. AR 464 then forwards a version of the request for the second channel independent frame to a channel monitoring device such as P-STB 470 which may be currently receiving, processing, decrypting, decoding, and generating independent media data frames corresponding to the decoded current state of the monitored channel.

Flow 600 continues with identifying an insertion position for the current independent frame relative to the current second channel frame set in operation 610. A preferred insertion position can be immediately before the subsequently identified dependent frames in the newly selected channel, so that processing of the dependent frames may seamlessly alter the current state defined initially by the generated independent frame as if the decoder had been receiving the newly selected channel all along. Once the insertion position is identified, flow 600 continues with generating a current independent frame based on the second channel current media state corresponding to the insertion position and storing the generated independent frame into a memory. In one example, P-STB 470 codec 474 decodes the received stream, processor 476 integrates the decoded frame with the current media state to form an updated current media state replacing the previous current media state, after which codec 474 encodes the current media state as an independent frame that may be stored into memory 478.

Once the current independent frame (C-Frame) is generated, flow 600 continues with retrieving the C-Frame and the recorded insertion position from the memory, if stored temporarily, and sending the information back to the distribution network to a distribution buffer configured to store and retrieve a queued version of the video stream in operation 614. Flow 600 continues with merging the generated independent frame into the distribution buffer at the insertion position to form a modified second channel cached data stream in operation 616. In this manner, the cached video stream is altered to provide insertion of a generated independent frame for the newly selected channel, and provide a rapid transition to decoding and displaying the newly selected channel. Flow 600 concludes with user STB 402 receiving and seamlessly decoding the modified second channel cached data stream including the generated independent frame and any subsequent related dependent media data frames in operation 618. In this manner, the modified second channel decoding produces a decoded media data that is identical with the media data provided by the entire corresponding unmodified second channel stream, so that the decoding of the second channel stream started with the modified frame set is equivalent to the true media content of the second channel. In this manner, the independent media data frame and corresponding dependent data frames may be decoded in a seamless manner. Alternatively, the P-STB 470 may only capture and process I-frames and P-frames, where the B-Frames are not captured, for example.

According to one or more embodiments of the present invention, the disclosed methods and systems to reduce channel selection transition delay in a digital network may have many benefits, including minimizing the impact of uncertainty of independent (I-Frame) arrival time in reference to when a user may requests a channel change, and reducing the "catch up" time between a unicast and multicast when merging two streams. These benefits may be especially pronounced when using a large Group of Pictures (GOP) where the broadcasted frame set may include a long chain of dependent data frames. Also, when using an encrypted multicast transport stream (e.g. encrypted MPEG), the requesting STB can display un-encrypted or "in the clear" generated independent frames from the P-STB without decryption delays.

Although the invention has been described with respect to particular embodiments, this description is only an example of the invention's application and should not be taken as a limitation. Consequently, the scope of the invention is set forth in the following claims.

We claim:

1. A network apparatus for providing a reduced channel selection transition delay from a first media data channel to a second media data channel, the apparatus comprising:
   a communications unit configured to receive message data and send and receive media data on a network, the media data comprising a frame set including one independent frame and a sequence of zero or more dependent frames carried on a media data channel, each frame having a predetermined position within the frame set; and
   a distribution unit configured to identify a processing unit that corresponds to a media data channel identified in a media data channel change request, the processing unit being one of a plurality of processing units corresponding to a plurality of media data channels; and
   the processing unit configured to provide a current media state by decoding a most recently received independent media data frame and related dependent media data frames, the processing unit utilizing one or more dependent media data frames to modify the current media state, the processing unit being configured to respond to a current independent media frame request message by providing a current independent media data frame corresponding to the current media state at a current media data frame set position,
   wherein the current independent media data frame and corresponding dependent data frames after the current media data frame set position are decoded in a seamless manner, and wherein the apparatus communicates with an aggregation router that communicates with a multiplexer, wherein the aggregation router comprises a distribution buffer selectively modifiable to alter content of a frame set in response to the media data channel change request so that one or more frames may be inserted or replaced prior to sending the frame set,
   wherein the processing unit is assigned to a media data channel, and then subsequently re-assigned to a different media data channel, based on user demand.

2. The apparatus of claim 1, further comprising:
   a memory unit configured to store and retrieve data, the memory unit configured to store and retrieve at least one of the current media state or current independent media data frame.

3. The apparatus of claim 1, wherein communication on the network conforms to the Internet Protocol.

4. The apparatus of claim 1, wherein the media data conforms to at least one of the International Organization for Standardization (ISO) document 13818-1, the ISO document 13818-2, or a Moving Pictures Experts Group (MPEG) standard.

5. The apparatus of claim 4, wherein the Moving Pictures Experts Group standard includes MPEG-1, MPEG-2, and MPEG-4.

6. The apparatus of claim 1, wherein the apparatus is configured to receive media data on the second media data channel, the apparatus being configured to receive the current independent media frame request from a second apparatus configured to send message data on the network, the current independent media frame request being generated in response to the second apparatus transitioning to receiving the second media data channel.

7. The apparatus of claim 6, wherein the second apparatus is configured to receive media data frames from the first media data channel before transitioning to receiving the second media data channel.

8. The apparatus of claim 6, wherein the second apparatus is configured to supply a video signal to at least one of a video display device or a video recording device.

9. The apparatus of claim 1,
   wherein the media data is encrypted; and
   wherein the apparatus is configured to send corresponding decryption information to the requesting device along with the current independent media data frame.

10. A method of reducing channel selection transition delay from a first media data channel to a second media data channel, the method comprising:
    accumulating an independent media data frame and any related dependent media data frames based on a first decoder decoding at least a first portion of a second media data channel frame set to form a second channel current media state, the dependent media data frames being used to modify the second channel current media state based on the independent media data frame;
    receiving a channel change request from a second decoder to change decoding to the second media data channel;
    identifying a processing unit from a plurality of processing units associated with a plurality of media data channels, the processing unit being associated with the second media data channel;
    identifying an insertion position for a current independent frame relative to the second media data channel frame set;
    generating the current independent frame based on the second channel current media state corresponding to the insertion position; and transmitting the current independent frame to an aggregation router, wherein the aggregation router comprises a distribution buffer selectively modifiable to alter content of a frame set in response to the channel change request so that one or more frames may be inserted or replaced prior to sending the frame set, wherein the processing unit is assigned to a media data channel, and then subsequently re-assigned to a different media data channel, based on user demand.

11. The method of claim 10, wherein the generated independent frame may be merged into a second channel cached data stream at the insertion position to form a modified second channel cached data stream, and wherein the modified second channel cached data stream may be decoded to provide a media state that is substantially identical to an original second channel media state at an equivalent relative time.

12. The method of claim 10, further comprising:

sending the current independent frame to the second decoder.

13. The method of claim 10, wherein the modified second channel frame set includes at least one dependent media data frame configured to modify the second channel current media state.

14. The method of claim 10, wherein the media data conforms to at least one of the International Organization for Standardization (ISO) document 13818-1, the ISO document 13818-2, or a Moving Pictures Experts Group (MPEG) standard.

15. The method of claim 14, wherein the process of generating the current independent frame further comprises:

generating a current independent frame (C-Frame) based on the location of a predictive coded frame (P-Frame).

16. The method of claim 10, wherein the channel change request is based on an Internet Group Management Protocol (IGMP) join request.

17. The method of claim 10, further comprising:

merging the independent data frame into a media delivery stream.

18. The method of claim 10, wherein the media data is encrypted.

19. The method of claim 10, wherein the first data channel and the second data channel are asynchronous to each other.

20. An apparatus for providing a reduced channel selection transition delay from a first media data channel to a second media data channel, comprising:

means for receiving message data and sending and receiving media data on a network, the media data comprising an independent media data frame and zero or more related dependent media data frames carried on a media data channel;

means for controlling the sending and receiving of data;

a plurality of means for decoding a most recently received independent media data frame and zero or more related dependent media data frames to provide a current media state, each means for decoding being configured to utilize each dependent media data frame to modify the current media state;

means for identifying one of the plurality of means for decoding as being associated with the second media data channel; and means for responding to a current independent media frame request to provide a current independent media data frame corresponding to the current media state, wherein the current independent media data frame is transmitted to an aggregation router, wherein the aggregation router comprises a distribution buffer selectively modifiable to alter content of a media frame in response to a channel change request so that one or more frames may be inserted or replaced prior to sending the media frame, wherein the one of the plurality of means for decoding is assigned to a media data channel, and then subsequently re-assigned to a different media data channel, based on user demand.

21. The apparatus of claim 20, wherein communication on the network conforms to the Internet Protocol.

22. The apparatus of claim 20, wherein the media data conforms to at least one of the International Organization for Standardization (ISO) document 13818-1, the ISO document 13818-2, or a Moving Pictures Experts Group (MPEG) standard.

23. The apparatus of claim 22, wherein the Moving Pictures Experts Group standards include MPEG-1, MPEG-2, and MPEG-4.

24. The apparatus of claim 1, wherein the current independent media data frame is transmitted to a subscriber premises without encryption.

* * * * *

UNITED STATES PATENT AND TRADEMARK OFFICE
CERTIFICATE OF CORRECTION

| | | |
|---|---|---|
| PATENT NO. | : 8,245,264 B2 | Page 1 of 1 |
| APPLICATION NO. | : 11/442500 | |
| DATED | : August 14, 2012 | |
| INVENTOR(S) | : John Toebes et al. | |

It is certified that error appears in the above-identified patent and that said Letters Patent is hereby corrected as shown below:

Column 9, line 9 change:
"stream since the video stream from broadcas feed 440 is"

to read:
--stream since the video stream from broadcast feed 440 is--

Column 9, line 58 change:
"defined by independent frame P& 562. Hence, the channel"

to read:
--defined by independent frame P7 562. Hence, the channel--

Signed and Sealed this
Thirtieth Day of October, 2012

David J. Kappos
*Director of the United States Patent and Trademark Office*